United States Patent
Ikeda

(10) Patent No.: US 11,872,845 B2
(45) Date of Patent: Jan. 16, 2024

(54) TIRE

(71) Applicant: Sumitomo Rubber Industries, Ltd., Hyogo (JP)

(72) Inventor: Ryota Ikeda, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/931,427

(22) Filed: Sep. 12, 2022

(65) Prior Publication Data

US 2023/0082581 A1 Mar. 16, 2023

(30) Foreign Application Priority Data

Sep. 15, 2021 (JP) ................................ 2021-150438
Sep. 15, 2021 (JP) ................................ 2021-150439
Dec. 16, 2021 (JP) ................................ 2021-204474

(51) Int. Cl.
*B60C 11/12* (2006.01)
*B60C 11/03* (2006.01)

(52) U.S. Cl.
CPC ...... *B60C 11/1204* (2013.01); *B60C 11/1272* (2013.01); *B60C 2011/0341* (2013.01)

(58) Field of Classification Search
CPC ............ B60C 11/0304; B60C 11/1204; B60C 11/1272; B60C 2011/0341; B60C 2011/1254; B60C 11/04; B60C 11/0306
See application file for complete search history.

(56) References Cited

U.S. PATENT DOCUMENTS

| | | | |
|---|---|---|---|
| 2017/0106703 A1 | 4/2017 | Kubo | |
| 2017/0297377 A1* | 10/2017 | Honda | B60C 11/0304 |
| 2018/0072105 A1 | 3/2018 | Wakasugi | |
| 2019/0359003 A1* | 11/2019 | Takano | B60C 11/1236 |

(Continued)

FOREIGN PATENT DOCUMENTS

| | | | |
|---|---|---|---|
| CN | 105835630 A | * | 8/2016 |
| EP | 3 842 263 A1 | | 6/2021 |

(Continued)

OTHER PUBLICATIONS

CN 105835630 Machine Translation (Year: 2016).*

(Continued)

*Primary Examiner* — Justin R Fischer
*Assistant Examiner* — Wendy L Boss
(74) *Attorney, Agent, or Firm* — Studebaker & Brackett PC

(57) ABSTRACT

A tire includes a tread portion including four circumferential grooves extending continuously in the tire circumferential direction and five land portions divided by the four circumferential grooves. The five land portions include a first middle land portion located between a first tread edge and a tire equator. The first middle land portion is provided with first middle sipes inclined with respect to a tire axial direction and fully traversing the first middle land portion in the tire axial direction. Each first middle sipe includes a pair of sipe edges, and at least one of the pair of sipe edges opens at the ground contact surface via a chamfer portion over an entire length thereof. The chamfer portion has a chamfer width increasing continuously from a first longitudinal edge to a second longitudinal edge of the first middle land portion.

19 Claims, 12 Drawing Sheets

(56) References Cited

U.S. PATENT DOCUMENTS

2019/0375243 A1    12/2019  Miyazaki
2019/0389255 A1    12/2019  Kubota et al.
2020/0164693 A1*    5/2020  Hayashi .............. B60C 11/1392

FOREIGN PATENT DOCUMENTS

| JP | 06239110 A | * | 8/1994 | |
| JP | 2005075213 A | * | 3/2005 | |
| JP | 2009061985 A | * | 3/2009 | |
| JP | 2017226369 A | * | 12/2017 | ......... B60C 11/0304 |
| JP | 2018-043637 A | | 3/2018 | |
| JP | 2020-066277 | | 4/2020 | |
| KR | 2010034780 A | * | 4/2010 | |

OTHER PUBLICATIONS

JP 2005075213 Machine Translation (Year: 2005).*
JP 06239110 Machine Translation (Year: 1994).*
KR 2010034780 Machine Translation (Year: 2010).*
JP 2017226369 Machine Translation (Year: 2017).*
The extended European search report issued by the European Patent Office dated Feb. 2, 2023, which corresponds to European Patent Application No. 22194266.7-1012 and is related to U.S. Appl. No. 17/931,427.

* cited by examiner

TIRE

RELATED APPLICATIONS

This application claims the benefit of foreign priority to Japanese Patent Applications No. 2021-150438, filed Sep. 15, 2021, No. 2021-150439, filed Sep. 15, 2021, and No. 2021-204474, filed Dec. 16, 2021, which are incorporated by reference in its entirety.

FIELD OF THE DISCLOSURE

The present disclosure relates to a tire.

BACKGROUND OF THE DISCLOSURE

Patent Document 1 below has proposed a pneumatic tire that is expected to improve wet performance and steering stability by modifying lug grooves and sipes provided on the shoulder land portions.

PATENT DOCUMENT

[PATENT DOCUMENT 1] Japanese Unexamined Patent Application Publication 2018-043637

SUMMARY OF THE DISCLOSURE

In recent years, with the increasing performance and quietness of vehicles, tires are required to further improve steering stability and noise performance. In Europe in particular, regulations on vehicle exterior noise have become stricter, and tires that can comply with these regulations are in demand.

The present disclosure has been made in view of the above circumstances and has a major object to provide tires capable of exhibiting excellent steering stability and noise performance.

In one aspect of the present disclosure, a tire includes a tread portion. The tread portion includes a first tread edge, a second tread edge, four circumferential grooves extending continuously in a tire circumferential direction between the first tread edge and the second tread edge, and five land portions divided by the four circumferential grooves. The five land portions include a first middle land portion located between the first tread edge and a tire equator. The first middle land portion includes a first longitudinal edge extending in the tire circumferential direction on a first tread edge side, a second longitudinal edge extending in the tire circumferential direction on a second tread edge side, and a ground contact surface between the first longitudinal edge and the second longitudinal edge. The first middle land portion is provided with a plurality of first middle sipes inclined at an angle with respect to a tire axial direction and fully traversing the first middle land portion in the tire axial direction. Each of the plurality of first middle sipes includes a pair of sipe edges. At least one of the pair of sipe edges opens at the ground contact surface via a chamfer portion over an entire length thereof, and the chamfer portion has a chamfer width increasing from the first longitudinal edge to the second longitudinal edge continuously.

DETAILED DESCRIPTRION OF THE DISCLOSURE

Hereinafter, an embodiment of the present disclosure will be described with reference to the drawings.

Figure 1:
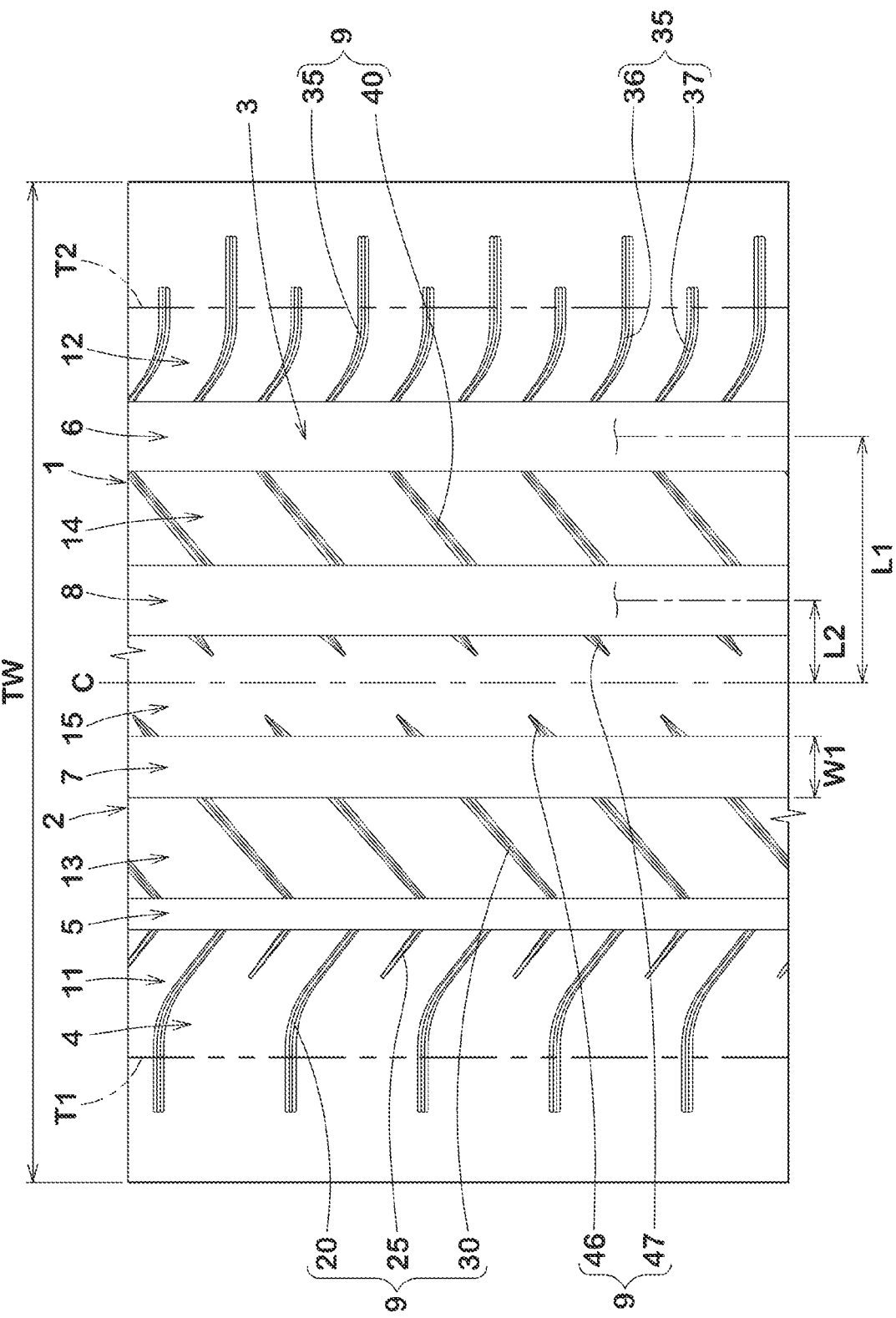
FIG. 1 is a development view of a tread portion of a tire showing an embodiment of the present disclosure.

FIG. 1 is a development view of a tread portion 2 of a tire 1 showing an embodiment of the present disclosure. The tire 1 according to the present embodiment is suitably used, for example, as a pneumatic tire for a passenger car. However, the present disclosure is not limited to such an aspect, and may be applied to a heavy-duty pneumatic tire and non-pneumatic tires that are not filled with pressurized air.

As illustrated in FIG. 1, the tread portion 2 according to the present disclosure includes a first tread edge T1, a second tread edge T2, four circumferential grooves 3 extending continuously in the tire circumferential direction between the first tread edge T1 and the second tread edge T2, and five land portions 4 divided by the four circumferential grooves 3. That is, the tire 1 according to the present disclosure is configured as a so-called 5-rib tire in which the tread portion 2 is composed of four circumferential grooves 3 and five land portions 4.

The tread portion 2 according to the present embodiment, for example, has a designated mounting direction on a vehicle. Thus, the first tread edge T1 is intended to be located on the outer side of the vehicle when the tire 1 is mounted on the vehicle. The second tread edge T2 is intended to be located on the inner side of the vehicle when the tire 1 is mounted on the vehicle. The mounting direction on a vehicle is indicated, for example, by characters or marks on a sidewall portion (not illustrated). However, the tire 1 according to the present disclosure is not limited to such an aspect, and may be a tire that does not have a designated mounting direction on a vehicle.

The first tread edge T1 and the second tread edge T2 correspond to axially spaced tread edges of a 50%-load ground contact surface obtained when a 50% of a standard tire load is applied to the tire 1 under a normal state and the tread portion 2 is grounded on a plane at zero camber angles.

As used herein, when the tire is a pneumatic tire for which various standards are defined, the "normal state" of the tire is such that the tire is mounted onto a standard wheel rim with a standard inner pressure but loaded with no tire load. In the case of a non-pneumatic tire or a tire for which various standards are not defined, the normal state means a standard use state, corresponding to the purpose of use of the tire, where the tire is not mounted on a vehicle and no load is applied to the tire. As used herein, unless otherwise noted, dimensions and the like of components of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard inner pressure" is a standard air pressure officially approved for each tire by standards organizations on which the tire is based, wherein the standard inner pressure is the "maximum air pressure" in JATMA, the maximum pressure given in the "Tire Load Limits at Various Cold Inflation Pressures" table in TRA, and the "Inflation Pressure" in ETRTO, for example.

As used herein, when the tire is a pneumatic tire for which various standards are defined, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. In addition, in the case of a tire for which various standards are not defined, the "standard tire load" refers to the maximum load applicable when the tire is used, according to the above-described standards.

The circumferential grooves 3 include a first shoulder circumferential groove 5, a second shoulder circumferential groove 6, a first crown circumferential groove 7 and the second crown circumferential groove 8. The first shoulder circumferential groove 5 is located nearest to the first tread edge T1 among the four circumferential grooves 3. The second shoulder circumferential groove 6 is located nearest to the second tread edge T2 among the four circumferential grooves 3. The first crown circumferential groove 7 is located between the first shoulder circumferential groove 5 and the tire equator C. The second crown circumferential groove 8 is located between the second shoulder circumferential groove 6 and the tire equator C.

A distance L1 in the tire axial direction from the tire equator C to the groove center line of the first shoulder circumferential groove 5 or the second shoulder circumferential groove 6, for example, is preferably in a range from 20% to 30% of the tread width TW. A distance L2 in the tire axial direction from the tire equator C to the groove center line of the first crown circumferential groove 7 or the second crown circumferential groove 8, for example, is preferably in a range from 5% to 15% of the tread width TW. The tread width TW is the distance in the tire axial direction from the first tread end T1 to the second tread end T2 in the normal state.

The circumferential grooves 3 according to the present embodiment, for example, extend in a straight manner in parallel with the tire circumferential direction. Each circumferential groove 3 may extend, for example, in a wavy manner.

Preferably, a groove width W1 of each circumferential groove 3 is equal to or more than 3 mm. In addition, the groove width W1 of each circumferential groove 3 is preferably in a range from 3.0% to 8.5% of the tread width TW, for example. In the present embodiment, the first shoulder circumferential groove 5 has the smallest groove width among the four circumferential grooves 3. A depth of each circumferential groove 3, for example, is in a range from 5 to 10 mm in the case of pneumatic tires for passenger cars.

In some preferred embodiments, the first shoulder circumferential groove 5 has the smallest depth among the four circumferential grooves 3.

The five land portions 4 according to the present disclosure include a first middle land portion 13 located between the first tread edge T1 and the tire equator C. The first middle land portion 13 is defined between the first shoulder circumferential groove 5 and the first crown circumferential groove 7. In the present embodiment, the five land portions 4 further include a first shoulder land portion 11, a second shoulder land portion 12, a second middle land portion 14 and a crown land portion 15. The first shoulder land portion 11 includes the first tread edge T1, and is adjacent to the first middle land portion 13 via the first shoulder circumferential groove 5. The second shoulder land portion 12 includes the second tread edge T2, and is located outwardly in the tire axial direction of the second shoulder circumferential groove 6. The second middle land portion 14 is located between the second tread edge T2 and the tire equator C. Specifically, the second middle land portion 14 is defined between the second shoulder circumferential groove 6 and the second crown circumferential groove 8. The crown land portion 15 is defined between the first crown circumferential groove 7 and the second crown circumferential groove 8. Thus, the crown land portion 15 is located on the tire equator C.

Figure 2:
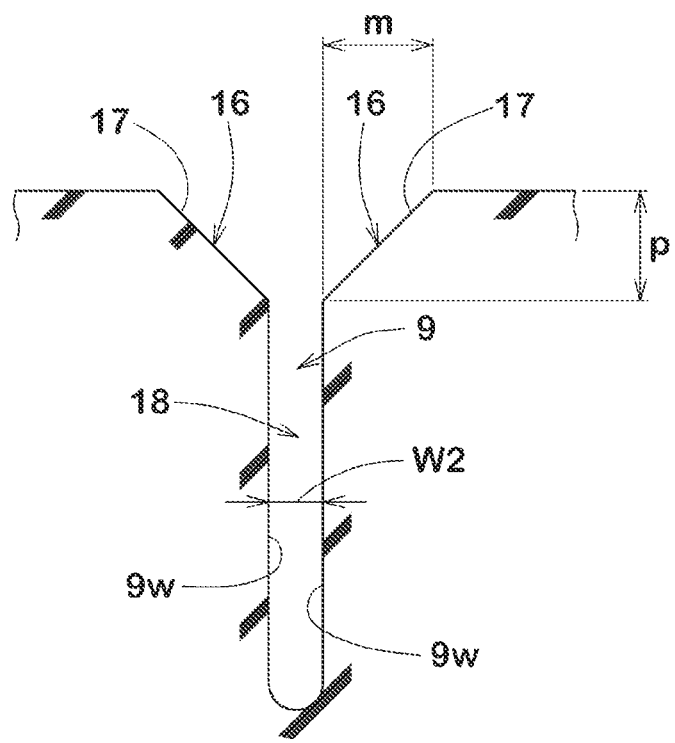
FIG. 2 is a cross-sectional view of a sipe.

Each of the five land portions 4, for example, is provided with a plurality of sipes 9. FIG. 2 illustrates a cross-sectional view of a typical sipe 9 in the present embodiment. Note that the configuration of sipe 9 shown in FIG. 2 can be applied to each sipe arranged in each land portion described later. As used herein, the "sipe" means an incision having a small width and having a width W2 of 2.0 mm or less between two sipe walls 9w in the sipe body 18, as illustrated in FIG. 2. The sipe main body 18 means a portion in which two sipe walls 9w extend substantially parallel to each other in the tire radial direction. Here, "substantially parallel" means that the angle between two sipe walls is equal to or less than 10 degrees. The width W2 between two sipe walls 9w is preferably equal to or less than 1.5 mm, more preferably in a range from 0.4 to 1.0 mm. Further, the total depth of sipe 9, for example, is in a range from 3.0 to 5.5 mm.

At least one sipe 9 may open at the ground contact surface of one or more land portions via one or more chamfered portions 16. Each chamfer portion 16, for example, is configured to include an inclined surface 17 connected to the ground contact surface and one sipe wall 9w. Hereinafter, such a sipe 9 may be referred to as a chamfered sipe. In FIG. 2, the sipe 9 includes a pair of sipe walls 9w each of which has the chamfer portion 16 of the inclined surface 17. Alternatively, the chamfered portion 16 may be provided on only either one of the sipe walls 9w. An angle of the inclined surface 17 with respect to the depth direction of the sipe 9, for example, is in a range from 30 to 60 degrees. In FIG. 2, each inclined surface 17 of each chamfered portion 16 has a flat inclined surface (a bevel), but it is not limited to such an aspect. For example, each inclined surface 17 may be configured as a curved surface that is convex outward in the tire radial direction or a curved surface that is concave inward in the tire radial direction. In place of each inclined surface 17, each chamfered portion 16 may include an inner surface recessed in a rectangular shape in a cross-sectional view of the sipe (not illustrated). Further, each chamfer portion 16 is defined by a chamfer width "m" and a chamfer depth "p" which are measured as shown in FIG. 2. The chamfer width "m" is measured at the ground contact surface of the land portion in a direction orthogonal to an extension direction of the sipe. The chamfer depth "p" is measured in a depth direction of the sipe.

A chamfer depth of each chamfered portion 16 is, for example, less than 30% of the total depth of the sipe 9, specifically equal to or less than 2.0 mm, more preferably equal to or less than 1.0 mm. Note that in the present disclosure each sipe 9 is not limited to the above-described aspect. Thus, the sipe 9 may extend with a uniform width from an opening at the ground contact surface to a bottom portion thereof. In addition, a flask bottom having a width greater than 2.0 mm may be connected to the bottom portion of the sipe 9.

Figure 3:
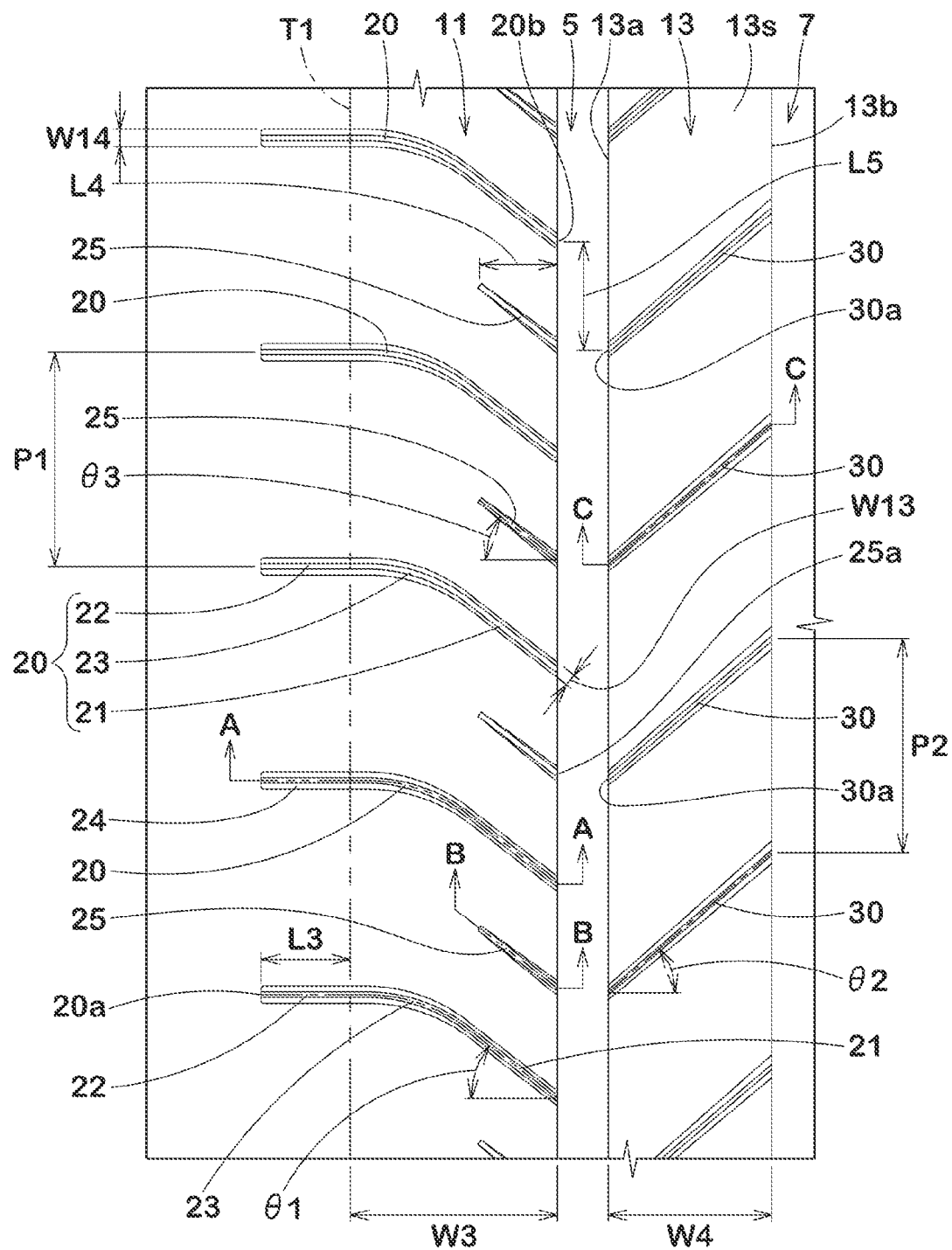
FIG. 3 is an enlarged view of a first shoulder land portion and a first middle land portion in FIG. 1.

FIG. 3 illustrates an enlarged view of the first shoulder land portion 11 and the first middle land portion 13 in FIG. 1. As illustrated in FIG. 3, the first middle land portion 13 includes a first longitudinal edge 13a extending in the tire circumferential direction on the first tread edge T1 side, a second longitudinal edge 13b extending in the tire circumferential direction on the second tread edge T2 side, and the ground contact surface 13s between the first longitudinal edge 13a and the second longitudinal edge 13b.

The first middle land portion 13 is provided with a plurality of first middle sipes 30 which is inclined at an angle with respect to the tire axial direction and which fully traverses the first middle land portion 13 in the tire axial direction.

Figure 4:
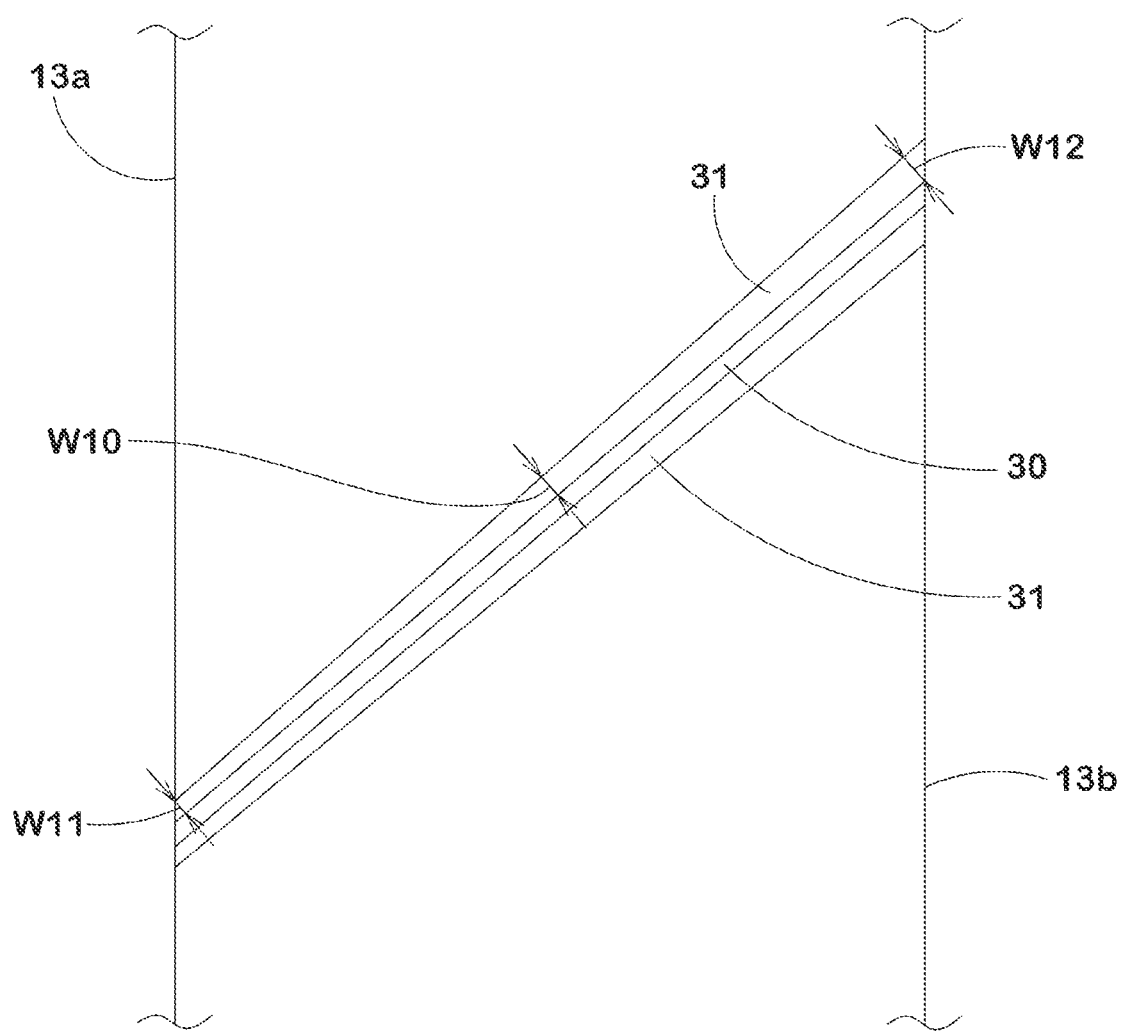
FIG. 4 is an enlarged view of one of first middle sipes shown in FIG. 3.

FIG. 4 illustrates an enlarged view of one of first middle sipes 30. As illustrated in FIG. 3 and FIG. 4, each first middle sipe includes a pair of sipe edges, and at least one of the pair of sipe edges opens at the ground contact surface 13s via a chamfer portion 31 over an entire length thereof. In this embodiment, both sipe edges of each first middle sipe 30 open at the ground contact surface 13s via the respective chamfer portions 31 over an entire length thereof. Further, as illustrated in FIG. 4, each chamfer portion 31 has a chamfer width W10 increasing from the first longitudinal edge 13a to the second longitudinal edge 13b continuously. In the present disclosure, by adopting the above configuration, excellent steering stability and noise performance can be exhibited. The mechanism can be as follows.

In the present disclosure, the first middle land portion 13 is provided with a plurality of first middle sipes 30, and each first middle sipe 30 opens at the ground contact surface 13s via the chamfer portion 31. As a result, the impact noise when the first middle sipes 30 come into contact with the ground is significantly reduced compared to non-chamfered sipes, improving noise performance. Further, in the present disclosure, the chamfer portion 31 of each first middle sipe 30 has the chamfer width W10 increasing from the first longitudinal edge 13a to the second longitudinal edge 13b continuously. This can ensure that the area of the ground contact surface on the first longitudinal edge 13a side, which is outside in the tire axial direction of the first middle land portion 13, is larger than the area of the ground contact surface on the second longitudinal edge 13b side of the first middle land portion 13. Thus, the rigidity of the first longitudinal edge 13a side of the first middle land portion 13 can significantly be increased. Therefore, the tire 1 according to the present disclosure can exhibit excellent steering stability even when the center of the ground plane moves to the first tread edge T1 side during cornering. Furthermore, due to the increase in the ground pressure acting on the first middle land portion 13, the surface of the chamfered portion 31 can also be grounded, and an increase in frictional force can be expected. The tire 1 according to the present disclosure can exhibit excellent steering stability and noise performance due to the mechanism described above.

Hereinafter, one or more detailed configurations of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the complex performance of the additional configurations will be improved.

As illustrated in FIG. 1, the land portions 4 defined in the tread portion 2 is not provided with any grooves having a groove width greater than 2.0 mm, and is provided with only sipes 9, in the respective ground contact surfaces of the land portions 4. Such a tread portion 2 can have small pattern noise and exhibit excellent noise performance. In addition, the tread portion 2 as such can have high pattern rigidity and be useful for increasing steering stability. Note that the groove means a groove in which, in a cross-sectional view thereof, a region where the distance between two groove walls is greater than 2.0 mm exceeds 50% of the total depth of the groove. However, the tire 1 according to the present disclosure is not limited to such an aspect, and one or more land portions 4 may be provided with one or more grooves appropriately.

As illustrated in FIG. 3, a one-pitch length P2 in the tire circumferential direction of the plurality of first middle sipes 30 is, for example, in a range from 100% to 150% of a width W4 in the tire axial direction of the ground contact surface 13s of the first middle land portion 13.

In FIG. 3, the first middle sipes 30 are inclined, for example, upward toward the right side with respect to the tire axial direction. A maximum angle θ2 of the first middle sipes 30 with respect to the tire axial direction is, for example, is in a range from 10 to 70 degrees, preferably 20 to 60 degrees. Such a first middle sipe 30 can provide a frictional force in the tire circumferential direction and the tire axial direction in a well-balanced manner.

As illustrated in FIG. 4, a chamfer width W11 of an end portion of each first middle sipe 30 on the first longitudinal edge 13a side is, for example, in a range from 0.3 to 1.0 mm, and a chamfer depth at the end portion is, for example, in a range from 0.3 to 1.0 mm. A chamfer width W12 of an end portion of each first middle sipe 30 on the second longitudinal edge 13b side is, for example, greater than 0.3 and not greater than 2.0 mm, and a chamfer depth at the end portion is, for example, in a range from 0.3 to 2.0 mm. Further, the chamfer width W12 is in a range from 1.2 to 1.8 times the chamfer width W11. The first middle sipes 30 like this can help to improve the balance between steering stability and noise performance.

Figure 5:
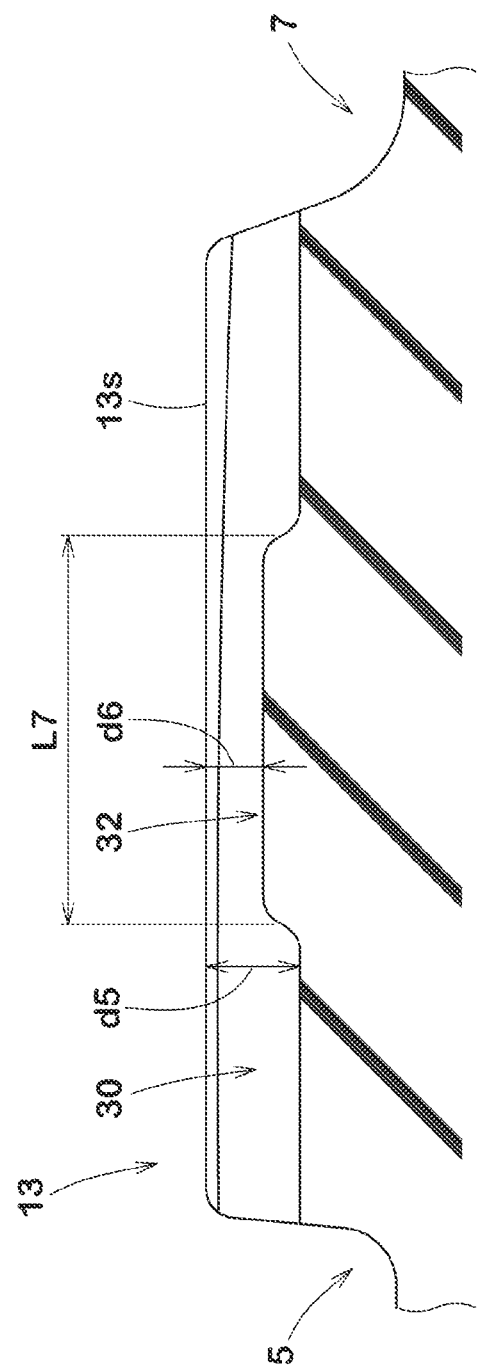
FIG. 5 is a cross-sectional view taken along the line C-C of FIG. 3.

FIG. 5 illustrates a cross-sectional view taken along the line C-C of FIG. 3. As illustrated in FIG. 5, one or more first middle sipes 30 may include, for example, a first middle tie-bar 32 raised locally at a bottom portion thereof. The first middle tie-bar 32 is provided, for example, in a center region out of three equal regions into which the first middle sipe 30 is divided in the tire axial direction. A length L7 in the tire axial direction of the first middle tie-bar 32 is in a range from 30% to 50% of the width W4 in the tire axial direction (shown in FIG. 3) of the ground contact surface 13s of the first middle land portion 13. Note that in the case where the length in the tire axial direction of the first middle tie-bar 32 varies in the tire radial direction, the length is measured at the center position in the tire radial direction. A depth d6 from the ground contact surface 13s of the first middle land portion 13 to the outer surface of the first middle tie-bar 32 is in a range from 50% to 70% of a maximum depth d5 of the first middle sipe 30. Such a first middle tie-bar 32 can maintain the stiffness of the first middle land portion 13, and can further improve steering stability.

As illustrated in FIG. 3, the first shoulder land portion 11 according to the present embodiment is provided with a plurality of first shoulder sipes 20 each extending from the first shoulder circumferential groove 5 to a location beyond the first tread end T1. One or more first shoulder sipes 20 may include an inclined portion 21 and an axial portion 22. The inclined portion 21 extends from the first shoulder circumferential groove 5 inclined at an angle with respect to the tire axial direction. The axial portion 22 has an angle with respect to the tire axial direction smaller than that of the inclined portion 21 and not greater than 10 degrees. In addition, the axial portion 22 crosses the first tread end T1.

Since the first shoulder sipes 20 include the inclined portions 21, the entire edges of the first shoulder sipes 20 can each come into contact with the ground with a time difference, so that sounds can be reduced when these edges come into contact with the ground. In addition, since the axial portions 22 cross the first tread end T1, the rigidity in the tire axial direction of the land portion near the first tread end T1 is not decreased by the first shoulder sipes 20, and excellent steering stability can be expected.

A one-pitch length P1 in the tire circumferential direction of the plurality of first shoulder sipes 20 is, for example, in a range from 80% to 120% of a width W3 of the ground contact surface of the first shoulder land portion 11. In some preferred embodiments, the one-pitch length P2 of the first middle sipes 30 and the one-pitch length P1 of the first shoulder sipes 20 are the same. Such an arrangement of the first shoulder sipes 20 can help to improve steering stability and noise performance in a well-balanced manner.

In the present embodiment, each inclined portion 21 is inclined downward toward the right side with respect to the tire axial direction. That is, each inclined portion 21 is inclined in the opposite direction to the first middle sipes 30 with respect to the tire axial direction. The maximum angle θ1 of each inclined portion 21 with respect to the tire axial direction is, for example, in a range from 10 to 70 degrees, preferably 20 to 60 degrees. In some more preferred embodiments, the angle θ1 may be equal to or less than the maximum angle θ2 of the first middle sipes 30 with respect to the tire axial direction. Preferably, the difference between the angle θ1 and the angle θ2 is equal to or less than 5 degrees. Note that the angle θ1 and the angle θ2 are the absolute values of the acute angles formed by the imaginary line extending parallel to the tire axial direction and the sipes. Further, the difference is the value obtained by subtracting the absolute value of the angle θ1 from the absolute value of the angle θ2.

When the angles between the inclined portions 21 of the first shoulder sipes 20 and the first middle sipes 30 have the above relationship, the first shoulder land portion 11 is equal to or slightly larger than the first middle land portion 13 with respect to the axial rigidity of these land portions. Such a rigidity distribution can enhance the response and linearity of steering, and thus further improve steering stability.

Each axial portion 22 extends, for example, in a straight manner. The axial portion 22 is preferably provided at an angle of 5 degrees or less with respect to the tire axial direction, more preferably in parallel with the tire axial direction. Such an axial portion 22 can provide a large frictional force during braking by the edges thereof.

A distance L3 in the tire axial direction from an outer end 20a of each first shoulder sipe 20 to the first tread edge T1 is, for example, in a range from 25% to 55%, more preferably 30% to 50%, of the width W3 in the tire axial direction of the ground contact surface of the first shoulder land portion 11. Such an axial portion 22 can also improve wandering performance in addition to improving steering stability and noise performance.

Preferably, each first shoulder sipe 20 may include a curved portion 23 extending so as to be curved between the inclined portion 21 and the axial portion 22. The curved portion 23 has, for example, an arc shape having a radius of curvature of from 10 to 40 mm. Such a curved portion 23 can suppress uneven wear of the first shoulder land portion 11.

Each first shoulder sipe 20 is formed as the above-described chamfered sipe, and each of the entire sipe edges on both sides thereof is formed as a chamfered portion. In addition, in a tread plan view, a chamfer width of the chamfered portion 24 of each first shoulder sipe 20 increases outwardly in the tire axial direction. Specifically, each of the chamfered portions of the inclined portion 21 and the axial portion 22 extends with a respective uniform chamfer width, and a chamfer width of the chamfered portion of the curved portion 23 increases outwardly in the tire axial direction. Accordingly, in a tread plan view, the chamfer width of the chamfered portion of the axial portion 22 is larger than the chamfer width of the chamfered portion of the inclined portion 21. Specifically, the chamfer width of the chamfered portion of the axial portion 22 is in a range from 1.5 to 2.5 times the chamfer width of the chamfered portion of the inclined portion 21. The first shoulder sipes 20 each having such a chamfered portion can effectively suppress uneven wear around the first tread edge T1.

A chamfer width W13 of the chamfer portion 24 of an end portion of each first shoulder sipe 20 on the first shoulder circumferential groove 5 side is, for example, in a range from 0.3 to 1.0 mm, and a chamfer depth of the chamfer portion 24 at the end portion is, for example, in a range from 0.3 to 1.0 mm. A chamfer width W14 of the chamfer portion 24 of an axially outer end portion of each first shoulder sipe 20 is, for example, is in a range from 0.3 to 2.0 mm, and a chamfer depth of the chamfer portion 24 at the axially outer end portion is, for example, in a range from 0.3 to 2.0 mm. Preferably, the chamfer width W14 is in a range from 1.2 to 1.8 times the chamfer width W13.

In some more preferred embodiments, the maximum chamfer width of the chamfered portion 31 of each first middle sipe 30 is greater than the maximum chamfer width of the chamfered portion 24 of the inclined portion 21 of each first shoulder sipe 20. As a result, it is possible to improve steering stability and noise performance while suppressing uneven wear of the first middle land portion 13.

A distance L5 in the tire circumferential direction from an end 30a on the first shoulder circumferential groove 5 side of one of the first middle sipes 30 to an end 20b on the first shoulder circumferential groove 5 side of one of the first shoulder sipes 20 is, for example, in a range from 10% to 50%, and preferably 30% to 50%, of the one-pitch length P2 in the tire circumferential direction of the plurality of first middle sipes 30. Thus, steering stability and noise performance can be improved in a well-balanced manner.

Figure 6:
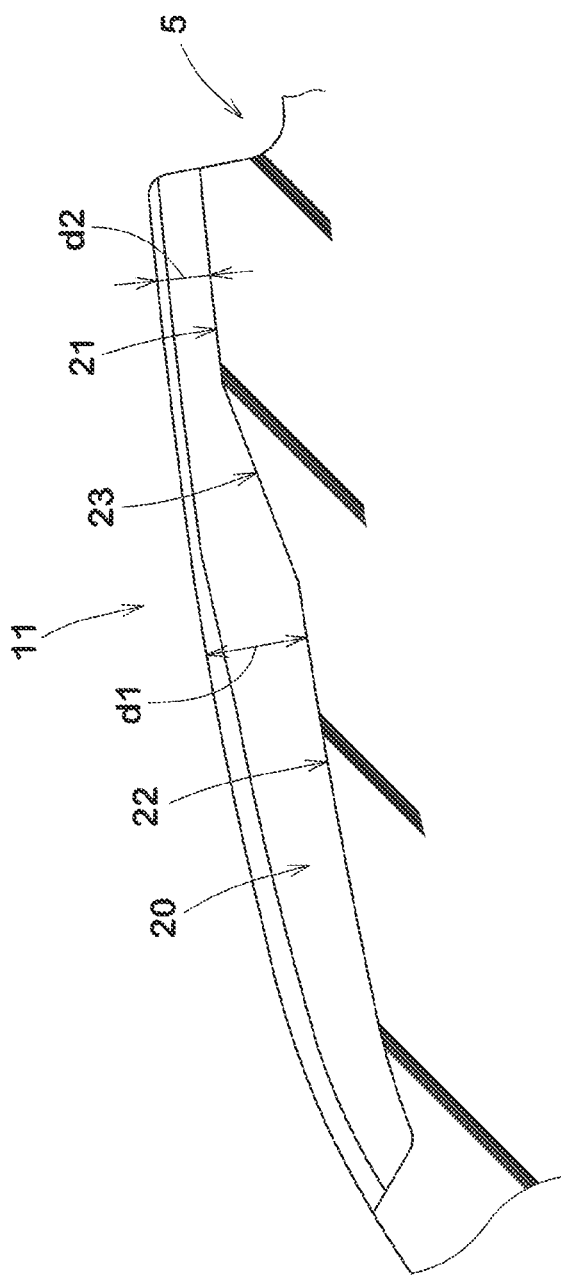
FIG. 6 is a cross-sectional view taken along the line A-A of FIG. 3.

FIG. 6 illustrates a cross-sectional view taken along the line A-A of FIG. 3. As illustrated in FIG. 6, the first shoulder sipes 20 each have a depth increasing from the inclined portion 21 toward the axial portion 22. In addition, a depth d2 of the inclined portion 21 is preferably in a range from 40% to 60% of the maximum depth d1 of the axial portion 22. This can increase the rigidity of the first shoulder land portion 11 on the inner side of the tire in the axial direction, resulting in excellent steering stability.

As illustrated in FIG. 3, the first shoulder land portion 11 according to the present embodiment is further provided with a plurality of shoulder termination sipes 25. In the present embodiment, the first shoulder sipes 20 and the shoulder termination sipes 25 are arranged alternately in the tire circumferential direction.

Each shoulder termination sipe 25 extends from the first shoulder circumferential groove 5 and terminates so as not to reach the first tread edge T1. Each shoulder termination sipe 25 terminates, for example, on the inner side in the tire axial direction with respect to the axial portions 22 of the first shoulder sipes 20, and terminates on the inner side in the tire axial direction with respect to the curved portions 23 of the first shoulder sipes 20 in a preferable aspect. In a further preferable aspect, each shoulder termination sipe 25 terminates without crossing the center position in the tire axial direction of the ground contact surface of the first shoulder land portion 11. A length L4 in the tire axial direction of each shoulder termination sipe 25 is, for example, in a range from 25% to 45%, preferably 30% to 40%, of the width W3 of the ground contact surface of the first shoulder land portion 11. Such a shoulder termination sipe 25 can further improve steering stability and noise performance.

Each shoulder termination sipe 25 is inclined in the opposite direction to the first middle sipes 30 with respect to the tire axial direction. That is, each shoulder termination sipe 25 is inclined in the same direction as the inclined portions 21 of the first shoulder sipes 20. An angle θ3 of each shoulder termination sipe 25 with respect to the tire axial direction is, for example, in a range from 10 to 60 degrees, preferably 20 to 60 degrees. In addition, the angle difference between the shoulder termination sipes 25 and the inclined portions 21 is, for example, equal to or less than 10 degrees, preferably equal to or less than 5 degrees. As a more preferred embodiment, in the present embodiment, the shoulder termination sipes 25 and the inclined portions 21 extend parallel to each other. Thus, uneven wear of the first shoulder land portion 11 can be suppressed.

Each shoulder termination sipe 25 is preferably formed as a chamfered sipe. The chamfered portion of each shoulder termination sipe 25 has a chamfer width decreasing outwardly in the tire axial direction from the first shoulder circumferential groove 5 side. Thus, the chamfer width of the chamfered portion at an inner end portion in the tire axial direction of each chamfered portion of the shoulder termination sipe 25 is larger than the chamfer width of the chamfered portion at an outer end portion in the tire axial direction of the chamfered portion of each shoulder termination sipe 25. In some more preferred aspects, the maximum chamfer width of the chamfered portion of each shoulder termination sipe 25 is set at an end portion on the first shoulder circumferential groove 5 side of the shoulder termination sipe 25, and is equal to the chamfer width of the chamfered portion of each inclined portion 21. In addition, the chamfer width of the chamfered portion of each shoulder termination sipe 25 continuously decreases from the position at which the maximum chamfer width is set, toward the outer side in the tire axial direction.

In addition, a distance in the tire circumferential direction from the end 30a on the first shoulder circumferential groove 5 side of one of the first middle sipes 30 to an end 25a on the first shoulder circumferential groove 5 side of one of the first termination shoulder sipes 25 is, for example, equal to or less than 20%, preferably equal to or less than 10%, of the one-pitch length P2. In the present embodiment, the above distance is substantially zero. In other words, the end 30a faces the end 25a.

Figure 7:
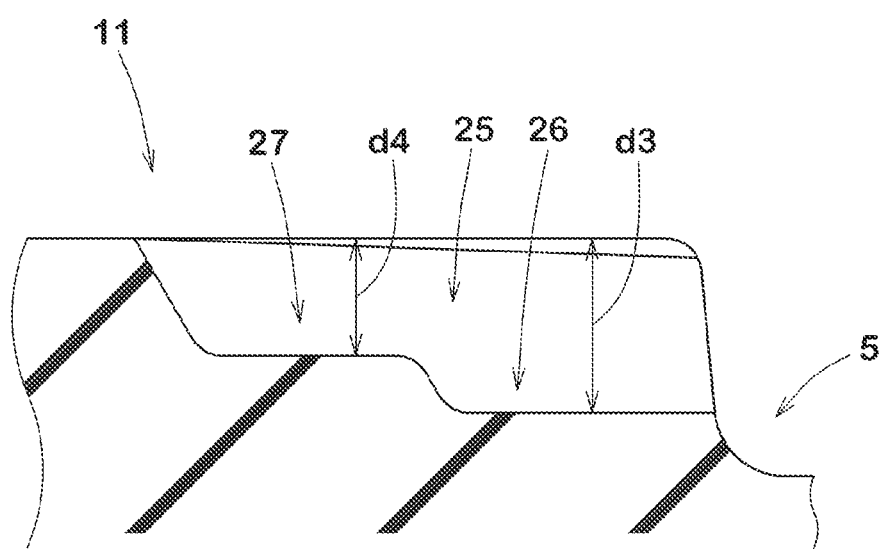
FIG. 7 is a cross-sectional view taken along the line B-B of FIG. 3.

FIG. 7 illustrates a cross-sectional view taken along the line B-B of FIG. 3. As illustrated in FIG. 7, each shoulder termination sipe 25 includes a first portion 26 communicating with the first shoulder circumferential groove 5, and a second portion 27 connected to the outer side in the tire axial direction of the first portion 26 and having a smaller depth than that of the first portion 26. A depth d4 of the second portion 27 is, for example, in a range from 60% to 75% of a depth d3 of the first portion 26. Such a shoulder termination sipe 25 can maintain the rigidity of the first shoulder land portion 11 and can improve steering stability.

Figure 8:
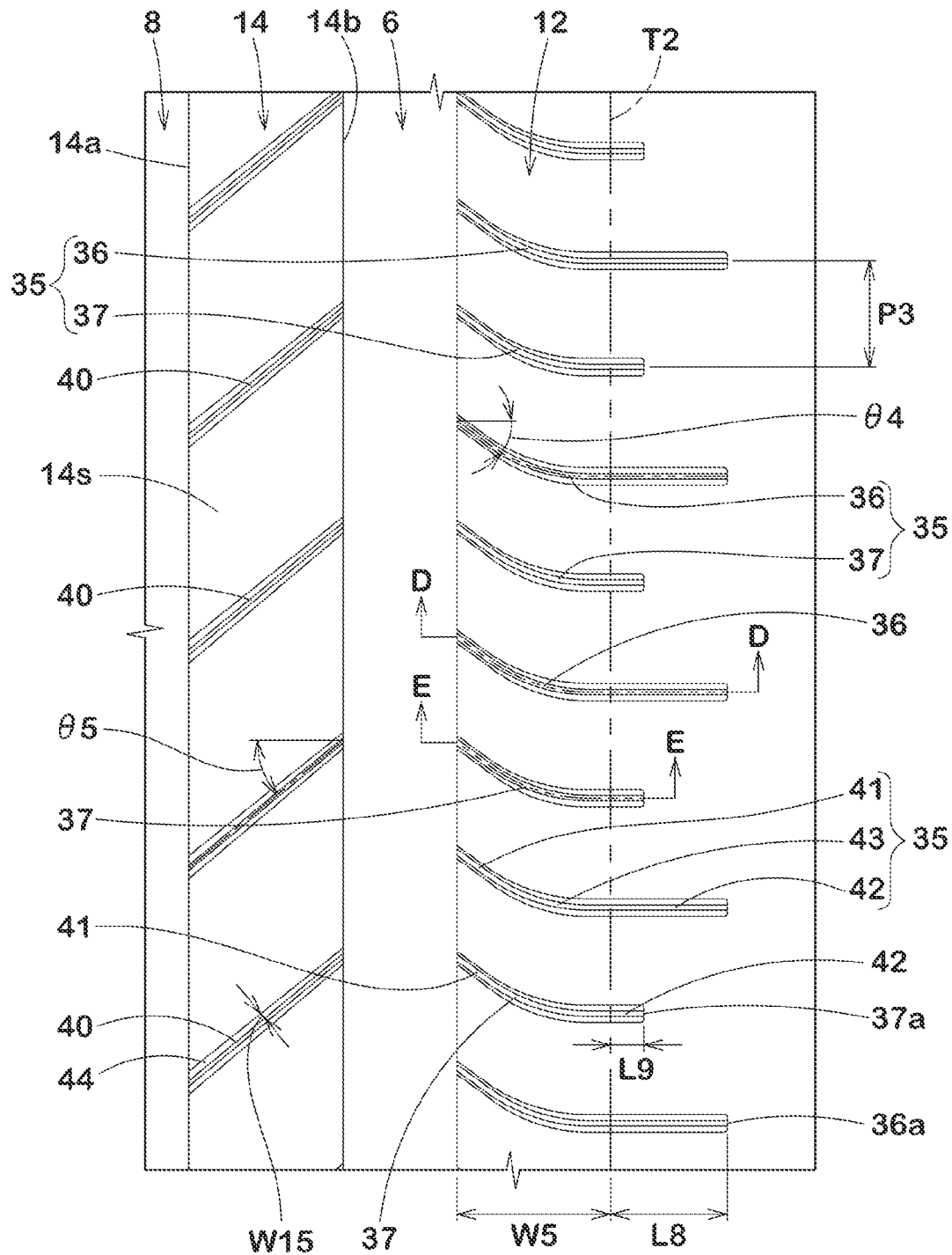
FIG. 8 is an enlarged view of a second shoulder land portion and a second middle land portion in FIG. 1.

FIG. 8 illustrates an enlarged view of the second shoulder land portion 12 and the second middle land portion 14 in FIG. 1. As illustrated in FIG. 8, the second shoulder land portion 12 according to the present embodiment is provided with a plurality of second shoulder sipes 35 which has the same configuration as the above-described first shoulder sipes 20.

A one-pitch length P3 in the tire circumferential direction of the plurality of second shoulder sipes 35 is preferably, for example, smaller than a width W5 in the tire axial direction of the ground contact surface of the second shoulder land portion 12, and is specifically in a range from 60% to 80% of the width W5. In addition, the one-pitch length P3 is in a range from 40% to 60% of the one-pitch length P1 (shown in FIG. 3) of the first shoulder sipes 20. Thus, the number of second shoulder sipes 35 provided on the second shoulder land portion 12 is larger than the number of first shoulder sipes 20 provided on the first shoulder land portion 11. Owing to such arrangement of the sipes, sequential impact sound generated when the first shoulder land portion 11 and the second shoulder land portion 12 come into contact with the ground are made to become white noise, so that noise performance can be improved.

Each second shoulder sipe 35 extends from the second shoulder circumferential groove 6 to a location beyond the second tread edge T2. Each second shoulder sipe 35 includes, for example, an inclined portion 41, an axial portion 42, and a curved portion 43. The inclined portion 41 extends from the second shoulder circumferential groove 6 so as to be inclined. The axial portion 42 has an angle with respect to the tire axial direction smaller than that of the inclined portion 41 and not greater than 10 degrees. In addition, each axial portion 42 crosses the second tread edge T2. Each curved portion 43 extends so as to be curved between the inclined portion 41 and the axial portion 42. Such a second shoulder sipe 35 can improve steering stability and noise performance by the same mechanism as the first shoulder sipes 20.

The configurations of the inclined portions 21, the axial portions 22, and the curved portions 23 of the first shoulder sipes 20 described above can be applied to the inclined portion 41, the axial portion 42, and the curved portion 43 of each second shoulder sipe 35, except for the matters described below.

The inclined portion 41 of each second shoulder sipe 35 is inclined in the opposite direction to the first middle sipes 30 (shown in FIG. 3) with respect to the tire axial direction. A maximum angle θ4 of the inclined portion 41 of each second shoulder sipe 35 with respect to the tire axial direction is, for example, in a range from 10 to 60 degrees, preferably 20 to 50 degrees. In addition, the difference between the angle θ1 and the angle θ4 is preferably equal to or less than 5 degrees. Thus, sequential impact sound generated when the first shoulder sipes 20 and the second shoulder sipes 35 come into contact with the ground are easily made to become white noise, so that noise performance can further be improved.

The second shoulder sipes 35 include, for example, standard second shoulder sipes 36 and small second shoulder sipes 37. A distance L8 in the tire axial direction from an outer end 36a in the tire axial direction of each standard second shoulder sipe 36 to the second tread edge T2 is preferably larger than the distance L3 in the tire axial direction (shown in FIG. 3) from the outer end 20a of each first shoulder sipe 20 to the first tread edge T1, and is specifically in a range from 125% to 140% of the distance L3.

Each small second shoulder sipe 37 has a smaller length in the tire axial direction than each standard second shoulder sipe 36. A distance L9 in the tire axial direction from an outer end 37a of each small second shoulder sipe 37 to the second tread edge T2 is in a range from 15% to 25% of the distance L8 from the outer end 36a of each standard second shoulder sipe 36 to the second tread edge T2. In addition, on the second shoulder land portion 12 according to the present embodiment, the standard second shoulder sipes 36 and the small second shoulder sipes 37 are arranged alternately in the tire circumferential direction. Such an arrangement of the sipes can help to improve noise performance and wandering performance.

Figure 9:
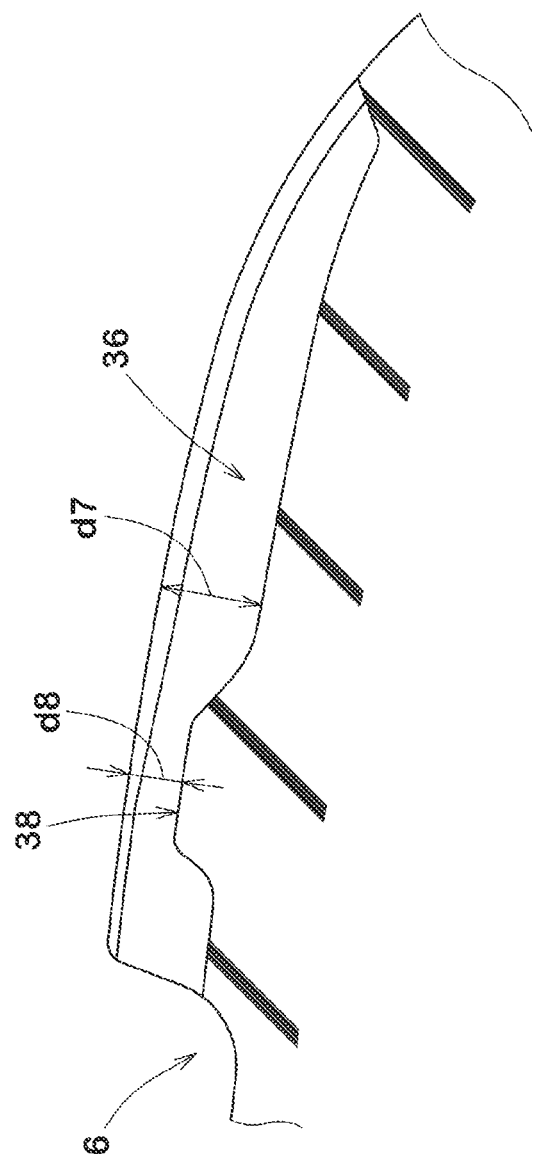
FIG. 9 is a cross-sectional view taken along the line D-D of FIG. 8.

FIG. 9 illustrates a cross-sectional view taken along the line D-D of FIG. 8. As illustrated in FIG. 9, at least one standard second shoulder sipe 36 may include, for example, a second shoulder tie-bar 38 raised at a bottom portion thereof at a position away from an end portion on the second shoulder circumferential groove 6 side thereof. The second shoulder tie-bar 38 according to the present embodiment is provided, for example, at a position including at least a part of the curved portion 43. A depth d8 from the ground contact surface to the outer surface of the second shoulder tie-bar 38 is in a range from 40% to 60% of a maximum depth d7 of the standard second shoulder sipe 36. Such a second shoulder tie-bar 38 can maintain the rigidity of the second shoulder land portion 12, and can help to improve steering stability.

Figure 10:
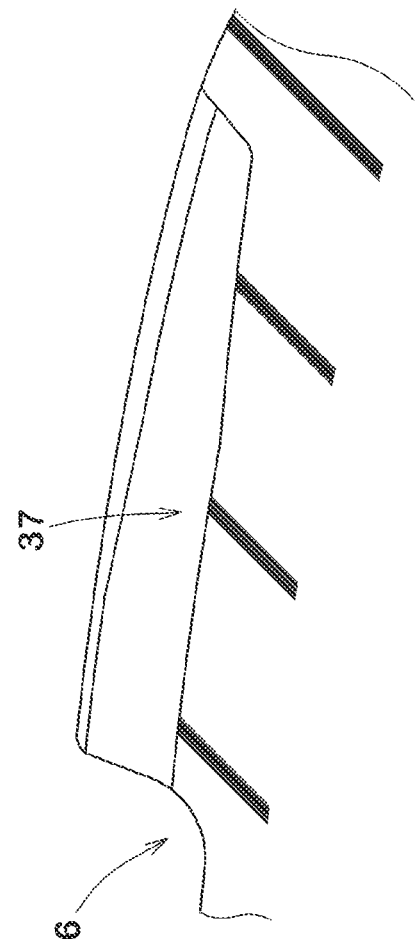
FIG. 10 is a cross-sectional view taken along the line E-E of FIG. 8.

FIG. 10 illustrates a cross-sectional view taken along the line E-E of FIG. 8. As illustrated in FIG. 10, each small second shoulder sipe 37 has a bottom portion extending flat in the longitudinal direction thereof. That is, each small second shoulder sipe 37 has no tie-bar raised at the bottom portion thereof. In the present embodiment, since such a small second shoulder sipe 37 and the above-described standard second shoulder sipes 36 are provided, sequential impact sound generated when these sipes come into contact with the ground are made to become white noise, so that noise performance can be improved.

As illustrated in FIG. 8, the second middle land portion 14 includes a first longitudinal edge 14a extending in the tire circumferential direction on the first tread edge T1 side, a second longitudinal edge 14b extending in the tire circumferential direction on the second tread edge side T2, and a ground contact surface 14s between the first longitudinal edge 14a and the second longitudinal edge 14b. The second middle land portion 14 is provided with a plurality of second middle sipes 40. The configuration of the above-described first middle sipe 30 can be applied to each second middle sipe 40 except for the matters described below, and the description thereof is omitted herein.

Each second middle sipe 40 is inclined at an angle with respect to the tire axial direction, and fully traverses the second middle land portion 14 in the tire axial direction. Each of the plurality of second middle sipes 40 includes a pair of sipe edges, and at least one of the pair of sipe edges opens at the ground contact surface 14s via a chamfer portion 44 over an entire length thereof. In this embodiment, both sipe edges of each second middle sipe 40 open at the ground contact surface 14s via the respective chamfer portions 44 over an entire length thereof. Further, each chamfer portion 44 of each second middle sipe 40 has a chamfer width W15 increasing from the second longitudinal edge 14b to the first longitudinal edge 14a continuously. The second middle sipes 40 like this can have the same mechanism as the first middle sipes 30 mentioned above, and can further improve steering stability and noise performance.

A maximum angle θ5 of the second middle sipes 40 with respect to the tire axial direction is preferably smaller than the maximum angle θ2 (shown in FIG. 3) of the first middle sipes 30 with respect to the tire axial direction. In some more preferable aspects, the absolute value |θ5-θ4| of the difference between the maximum angle θ5 of the second middle sipes 40 with respect to the tire axial direction and the maximum angle θ4 of the inclined portions 41 of the second shoulder sipes 35 with respect to the tire axial direction is preferably larger than the absolute value |θ2-θ1| of the difference between the maximum angle θ2 of the first middle sipes 30 with respect to the tire axial direction and the maximum angle θ1 of the inclined portions 21 of the first shoulder sipes 20 with respect to the tire axial direction. Thus, sequential impact sound generated when the sipes come into contact with the ground are easily made to become white noise, so that wear resistance and noise performance can be improved while uneven wear of each land portion can be suppressed.

Figure 11:
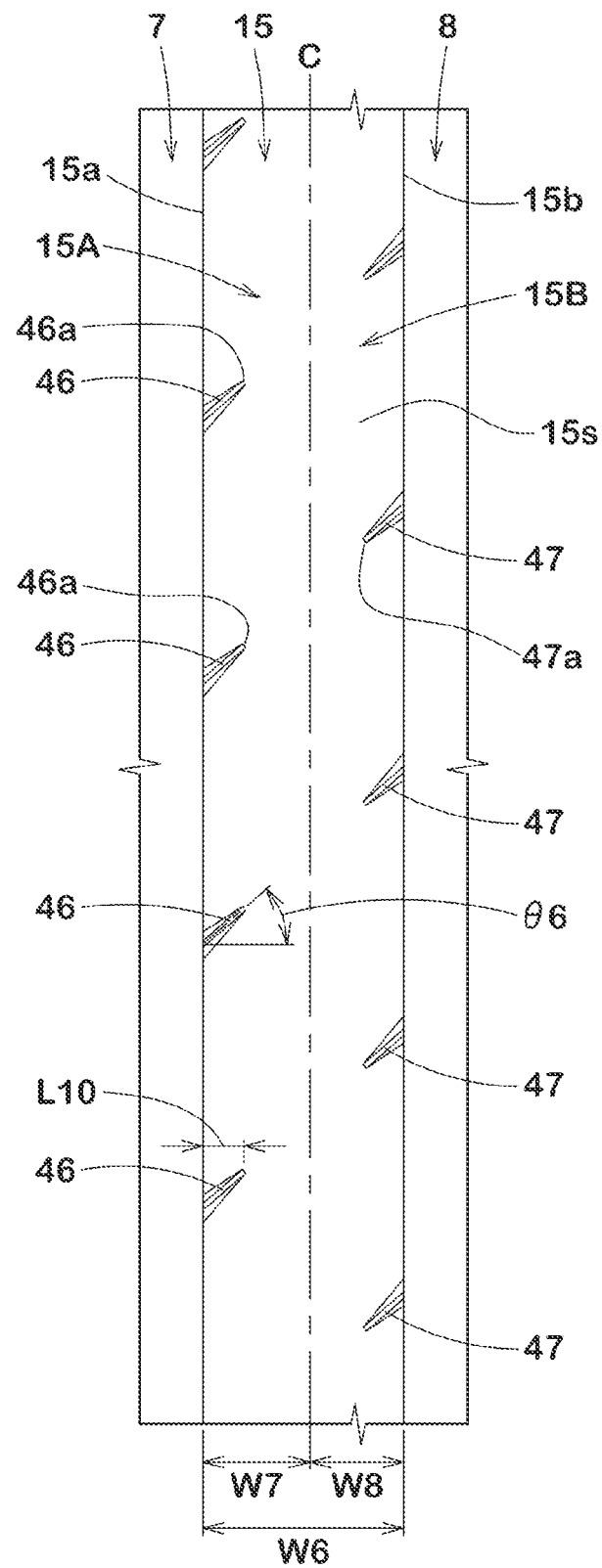
FIG. 11 is an enlarged view of a crown land portion shown in FIG. 1.

FIG. 11 illustrates an enlarged view of the crown land portion 15 shown in FIG. 1. As illustrated in FIG. 11, the center position in the tire axial direction of the crown land portion 15 is located on the first tread edge T1 (shown in FIG. 1) side with respect to the tire equator C. Thus, in the crown land portion 15, a width W7 of the ground contact surface in an outer region 15A on the first tread edge T1 side with respect to the tire equator C is larger than a width W8 of the ground contact surface in an inner region 15B on the second tread edge T2 side with respect to the tire equator C. Specifically, the width W7 of the outer region 15A is in a range from 51% to 55% of a width W6 in the tire axial direction of the ground contact surface of the crown land portion 15. Such a crown land portion 15 can linearize a change in cornering force with a change in steering angle, and can help to improve steering stability and ride comfort.

The crown land portion 15 includes a first longitudinal edge 15a extending in the tire circumferential direction on the first tread edge T1 side, a second longitudinal edge 15b extending in the tire circumferential direction on the second tread edge T2 side, and a ground contact surface 15s between the first longitudinal edge 15a and the second longitudinal edge 15b. The crown land portion 15 is provided with a plurality of first crown sipes 46 and a plurality of second crown sipes 47. Each first crown sipe 46, for example, extends from the first crown circumferential groove 7 and has a closed end 46a on the crown land portion 15. Each second crown sipe 47, for example, extends from the second crown circumferential groove 8 and has a closed end 47a on the crown land portion 15.

Each of the first crown sipes 46 and the second crown sipes 47 does not cross the center position in the tire axial direction of the crown land portion 15 and does not cross the tire equator C. A length L10 in the tire axial direction of each first crown sipe 46 or each second crown sipe 47 is, for example, in a range from 15% to 30% of the width W6 in the tire axial direction of the ground contact surface of the crown land portion 15. Thus, the rigidity of the crown land portion 15 can reliably be maintained, and excellent steering stability can be exhibited.

Each first crown sipe 46 and each second crown sipe 47 are inclined, for example, in the same direction as the first middle sipes 30 (shown in FIG. 3) with respect to the tire axial direction. A maximum angle $\theta6$ of the first crown sipes 46 or the second crown sipes 47 with respect to the tire axial direction is, for example, in a range from 10 to 70 degrees, preferably 20 to 60 degrees. In some more preferred aspects, the angle difference between the first crown sipes 46 and the second crown sipes 47 is equal to or less than 5 degrees, and these sipes are arranged in parallel with each other in the present embodiment. Such first crown sipes 46 and second crown sipes 47 can provide a frictional force in the tire circumferential direction and the tire axial direction in a well-balanced manner.

In some more preferred aspects, the maximum angle $\theta6$ of the first crown sipes 46 or the second crown sipes 47 with respect to the tire axial direction is preferably equal to or less than the angle $\theta2$ (shown in FIG. 3) of the first middle sipes 30 with respect to the tire axial direction, and is preferably equal to or more than the angle $\theta5$ (shown in FIG. 8) of the second middle sipes 40 with respect to the tire axial direction. Thus, noise performance can be improved while suppressing uneven wear of each land portion.

The first crown sipes 46 and the second crown sipes 47 open at the ground contact surface 15s via the respective chamfer portions over the entire lengths thereof. In some preferred aspects, the chamfer portion of each first crown sipe 46 has a chamfer width decreasing continuously from the first longitudinal edge 15a to the closed end 46a. The chamfer portion of each second crown sipe 47 has a chamfer width decreasing continuously from the second longitudinal edge 15b to the closed end 47a. Such a first crown sipes 46 and such a second crown sipes 47 can suppress uneven wear of the crown land portion 15.

A chamfer width of an end portion of each first crown sipe 46 on the first longitudinal edge 15a side is in a range from 0.3 to 2.0 mm, and a chamfer depth of this end portion is in a range from 0.3 to 2.0 mm. The chamfer portion of each second crown sipe 47 is similar to that of the first crown sipes 46.

In this embodiment, no sipes other than the above-mentioned sipes are provided on the land portions. As a result, the various performances described above can be exhibited in a well-balanced manner. However, the present disclosure is not limited to such an aspect.

Figure 12:
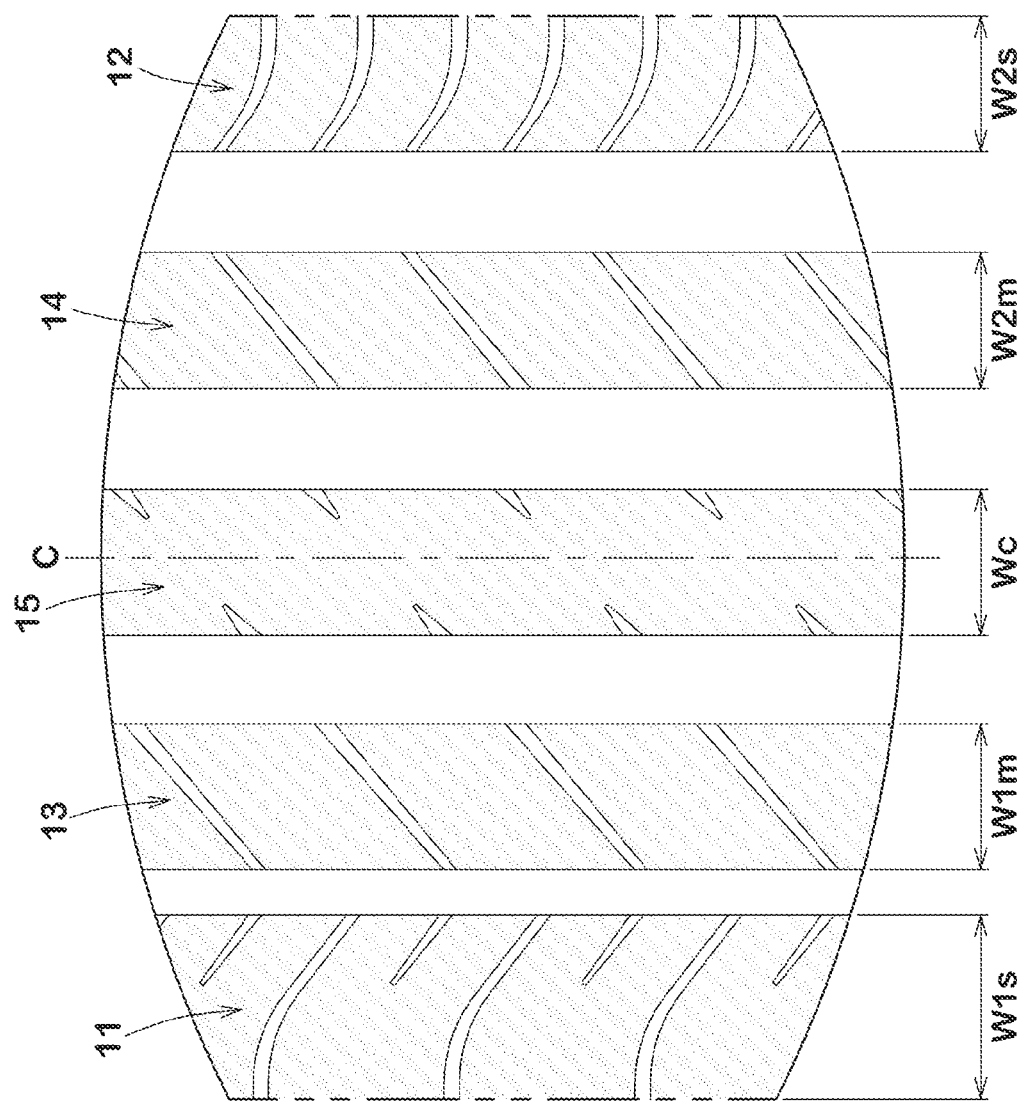
FIG. 12 is an enlarged view showing a ground contact surface shape when the tread portion is in contact with the ground.

As described above, the tread portion 2 according to the present embodiment has a designated mounting direction on a vehicle, the first tread edge T1 is intended to be located on the outer side of the vehicle when mounted on the vehicle, and the second tread edge T2 is intended to be located on the inner side of the vehicle when mounted on the vehicle. In other words, the first shoulder land portion 11 and the first middle land portion 13 are positioned outside of the vehicle when mounted on the vehicle, compared to the second shoulder land portion 12 and the second middle land portion 14. Preferably, the respective widths of the ground surfaces of the land portions are determined based on such usage conditions. FIG. 12 illustrates an enlarged view showing a ground contact surface shape when the tread portion 2 is in contact with the ground. As illustrated in FIG. 12, in a state where the tire 1 is mounted on the standard wheel rim with the standard inner pressure, 50% of the standard tire load is applied to the tire 1, and the tire 1 is grounded on a plane at zero camber angles (hereinafter, referred to as "50%-loaded-state"), a width W1s in the tire axial direction of the ground contact surface of the first shoulder land portion 11 is preferably larger than a width W2s in the tire axial direction of the ground contact surface of the second shoulder land portion 12. In addition, a width W1m in the tire axial direction of the ground contact surface of the first middle land portion 13 is preferably larger than a width W2m in the tire axial direction of the ground contact surface of the second middle land portion 14. Owing to such a land portion width distribution, steering stability can further be improved.

In some more preferred aspects, in the 50%-loaded-state, when maximum widths in the tire axial direction of the ground contact surfaces of the first shoulder land portion 11, the first middle land portion 13, the crown land portion 15, the second middle land portion 14 and the second shoulder land portion 12 are respectively denoted by W1s, Wm, Wc, W2m, and W2s, the following formula (1) is satisfied. In addition, as a further preferred aspect, the tire 1 according to the present embodiment also satisfies the following formula (2). In such a tire 1, the land portion closer to the first tread edge T1 has higher rigidity. Thus, even when the center of the ground contact surface moves toward the first tread edge T1 side due to steering, the steering response can be stabilized, and a cornering force is generated so as to be linear with respect to an increase in steering angle. Accordingly, excellent steering stability and ride comfort can be achieved.

$$W1m > Wc > W2m \quad (1)$$

$$W1s > W1m > Wc > W2m \geq W2s \quad (2)$$

In the 50%-loaded-state, the width W1s in the tire axial direction of the ground contact surface of the first shoulder land portion 11 is preferably in a range from 115% to 125% of the width Wc in the tire axial direction of the ground contact surface of the crown land portion 15. Accordingly, the rigidity of the first shoulder land portion 11 can be optimized, so that noise performance can also be improved in addition to the above-described effects.

From the same viewpoint, in the 50%-loaded-state, the width W1m in the tire axial direction of the ground contact surface of the first middle land portion 13 is preferably in a range from 101% to 107% of the width Wc in the tire axial direction of the ground contact surface of the crown land portion 15.

In the 50%-loaded-state, the width W2m in the tire axial direction of the ground contact surface of the second middle land portion 14 is preferably in a range from 90% to 99% of the width Wc in the tire axial direction of the ground contact surface of the crown land portion 15. Thus, noise performance during straight running can be improved. In addition, vibration of the tire 1 during straight running is less likely to be transmitted to the vehicle body side, so that ride comfort can also be improved.

From the same viewpoint, in the 50%-loaded-state, the width W2s in the tire axial direction of the ground contact surface of the second shoulder land portion 12 is preferably in a range from 90% to 99% of the width Wc in the tire axial direction of the ground contact surface of the crown land portion 15.

As a further preferred aspect, in the present embodiment, in the 50%-loaded-state, the width W2m of the second middle land portion 14 is equal to the width W2s of the second shoulder land portion 12. Thus, the progress of wear of the second middle land portion 14 and the second shoulder land portion 12 can become uniform, so that uneven wear resistance can be improved.

While the particularly preferable embodiments of the tire in accordance with the present disclosure have been described in detail, the present disclosure is not limited to the illustrated embodiments, but can be modified and carried out in various aspects within the scope of the disclosure.

[ADDITIONAL NOTE]

The present disclosure includes the following aspects.

[Note 1]

A tire comprising:

a tread portion, wherein the tread portion comprises a first tread edge, a second tread edge, four circumferential grooves extending continuously in a tire circumferential direction between the first tread edge and the second tread edge, and five land portions divided by the four circumferential grooves, the five land portions comprise a first middle land portion located between the first tread edge and a tire equator, the first middle land portion comprises a first longitudinal edge extending in the tire circumferential direction on a first tread edge side, a second longitudinal edge extending in the tire circumferential direction on a second tread edge side, and a ground contact surface between the first longitudinal edge and the second longitudinal edge, the first middle land portion is provided with a plurality of first middle sipes inclined at an angle with respect to a tire axial direction and fully traversing the first middle land portion in the tire axial direction, each of the plurality of first middle sipes comprises a pair of sipe edges, at least one of the pair of sipe edges opens at the ground contact surface via a chamfer portion over an entire length thereof, and the chamfer portion has a chamfer width increasing from the first longitudinal edge to the second longitudinal edge continuously.

[Note 2]

The tire according to note 1, wherein the five land portions comprise a second middle land portion located between the second tread edge and the tire equator, the second middle land portion comprises a first longitudinal edge extending in the tire circumferential direction on the first tread edge side, a second longitudinal edge extending in the tire circumferential direction on the second tread edge side, and a ground contact surface between the first longitudinal edge and the second longitudinal edge, the second middle land portion is provided with a plurality of second middle sipes inclined at an angle with respect to the tire axial direction and fully traversing the second middle land portion in the tire axial direction, each of the plurality of second middle sipes comprises a pair of sipe edges, at least one of the pair of sipe edges opens at the ground contact surface of the second middle land portion via a chamfer portion over an entire length thereof, and the chamfer portion of each second middle sipe has a chamfer width increasing from the second longitudinal edge to the first longitudinal edge continuously.

[Note 3]

The tire according to note 2, wherein the plurality of first middle sipes is inclined in a same direction as the plurality of second middle sipes with respect to the tire axial direction.

[Note 4]

The tire according to any one of notes 1 to 3, wherein the five land portions are provided with only sipes.

[Note 5]

The tire according to any one of notes 1 to 4, wherein the tread portion has a designated mounting direction on a vehicle, the first tread edge is located on an outer side of the vehicle when the tire is mounted on the vehicle, the five land portions comprise a crown land portion adjacent to the first middle land portion at the second tread edge side, and a second middle land portion adjacent to the crown land portion at the second tread edge side, and in a 50%-loaded-state where the tire is mounted on a standard wheel rim with a standard inner pressure, 50% of a standard tire load is applied to the tire, and the tire is grounded on a plane at zero camber angles, when maximum widths in the tire axial direction of ground contact surfaces of the first middle land portion, the crown land portion and the second middle land portion are respectively denoted by W1m, Wc and W2m, the following formula (1) is satisfied:

$$W1m > Wc > W2m \qquad (1).$$

[Note 6]

The tire according to note 5, wherein the five land portions comprise a first shoulder land portion adjacent to the first middle land portion at the first tread edge side and a second shoulder land portion adjacent to the second middle land portion at the second tread edge side, and in the 50%-loaded-state, when maximum widths in the tire axial direction of ground contact surfaces of the first shoulder land portion and the second shoulder land portion are respectively denoted W1s and W2s, the following formula (2) is satisfied:

$$W1s > W1m > Wc > W2m \geq W2s \qquad (2).$$

[Note 7]

The tire according to any one of notes 1 to 6, wherein the four circumferential grooves comprise a first shoulder circumferential groove located nearest to the first tread edge side among the four circumferential grooves, the five land portions comprise a first shoulder land portion having the first tread edge and adjacent to the first middle land portion via the first shoulder circumferential groove, the first shoulder land portion is provided with a plurality of first shoulder sipes extending from the first shoulder circumferential groove to a location beyond the first tread edge, at least one of the plurality of first shoulder sipes comprises an inclined portion extending from the first shoulder circumferential groove and inclined with respect to the tire axial direction, and an axial portion having an angle with respect to the tire axial direction smaller than that of the inclined portion and not greater than 10 degrees, and the axial portion crosses the first tread edge.

[Note 8]

The tire according to note 7, wherein a maximum angle of the inclined portion with respect to the tire axial direction is equal to or less than a maximum angle of each first middle sipe with respect to the tire axial direction, and a difference between the maximum angle of the inclined portion and the maximum angle of each first middle sipe is equal to or less than 5 degrees.

[Note 9]

The tire according to any one of notes 1 to 8, wherein the five land portions comprise a crown land portion located on the tire equator, the crown land portion comprises a first longitudinal edge extending in the tire circumferential direction on the first tread edge side, a second longitudinal edge extending in the tire circumferential direction on the second tread edge side, and a ground contact surface between the first longitudinal edge and the second longitudinal edge, the crown land portion is provided with a plurality of first crown sipes each extending from the first longitudinal edge and having a closed end within the ground contact surface, and a plurality of second crown sipes each extending from the second longitudinal edge and having a closed end within the ground contact surface, each of the plurality of first crown sipes and the plurality of second crown sipes comprises a pair of sipe edges, at least one of the pair of sipe edges of at least one first crown sipe opens at the ground contact surface of the crown land portion via a chamfer portion over an entire length thereof, the chamfer portion of the at least one first crown sipe has a chamfer width increasing from the first longitudinal edge to the closed end thereof continuously, at least one of the pair of sipe edges of at least one second crown sipe opens at the ground contact surface of the crown land portion via a chamfer portion over an entire length thereof, and the chamfer portion of the at least one second crown sipe has a chamfer width increasing from the second longitudinal edge to the closed end thereof continuously.

The invention claimed is:

1. A tire comprising:

a tread portion, wherein the tread portion comprises a first tread edge, a second tread edge, four circumferential grooves extending continuously in a tire circumferential direction between the first tread edge and the second tread edge, and five land portions divided by the four circumferential grooves, the five land portions comprise a first middle land portion located between the first tread edge and a tire equator, the first middle land portion comprises a first longitudinal edge extending in the tire circumferential direction on a first tread edge side, a second longitudinal edge extending in the tire circumferential direction on a second tread edge side, and a ground contact surface between the first longitudinal edge and the second longitudinal edge, the first middle land portion is provided with a plurality of first middle sipes inclined at an angle with respect to a tire axial direction and fully traversing the first middle land portion in the tire axial direction, each of the plurality of first middle sipes comprises a pair of sipe edges, at least one of the pair of sipe edges opens at the ground contact surface via a chamfer portion over an entire length thereof, the chamfer portion has a chamfer width increasing from the first longitudinal edge to the second longitudinal edge continuously, the four circumferential grooves comprise a first shoulder circumferential groove located nearest to the first tread edge among the four circumferential grooves, the five land portions comprise a first shoulder land portion having the first tread edge and adjacent to the first middle land portion via the first shoulder circumferential groove, the first shoulder land portion is provided with a plurality of first shoulder sipes extending from the first shoulder circumferential groove to a location beyond the first tread edge, at least one of the plurality of first shoulder sipes comprises an inclined portion extending from the first shoulder circumferential groove and inclined with respect to the tire axial direction, and an axial portion having an angle with respect to the tire axial direction smaller than that of the inclined portion and not greater than 10 degrees, the axial portion crosses the first tread edge, each of the plurality of first shoulder sipes comprises a pair of first shoulder sipe edges, at least one of the pair of first shoulder sipe edges opens at a ground contact surface of the first shoulder land portion via a chamfer portion over an entire length thereof, each of the chamfered portions of the inclined portion and axial portion extends with a respective uniform chamfer width, and the chamfer width of the chamfered portion of the axial portion is larger than the chamfer width of the chamfered portion of the inclined portion.

2. The tire according to claim 1, wherein the five land portions comprise a second middle land portion located between the second tread edge and the tire equator, the second middle land portion comprises a first longitudinal edge extending in the tire circumferential direction on the first tread edge side, a second longitudinal edge extending in the tire circumferential direction on the second tread edge side, and a ground contact surface between the first longitudinal edge and the second longitudinal edge, the second middle land portion is provided with a plurality of second middle sipes inclined at an angle with respect to the tire axial direction and fully traversing the second middle land portion in the tire axial direction, each of the plurality of second middle sipes comprises a pair of sipe edges, at least one of the pair of sipe edges opens at the ground contact surface of the second middle land portion via a chamfer portion over an entire length thereof, and the chamfer portion of each second middle sipe has a chamfer width increasing from the second longitudinal edge to the first longitudinal edge continuously.

3. The tire according to claim 2, wherein the plurality of first middle sipes is inclined in a same direction as the plurality of second middle sipes with respect to the tire axial direction.

4. The tire according to claim 1, wherein
the five land portions are provided with only sipes.

5. The tire according to claim 1, wherein
the tread portion has a designated mounting direction on a vehicle,
the first tread edge is located on an outer side of the vehicle when the tire is mounted on the vehicle,
the five land portions comprise a crown land portion adjacent to the first middle land portion at the second tread edge side, and a second middle land portion adjacent to the crown land portion at the second tread edge side, and
in a 50%-loaded-state where the tire is mounted on a standard wheel rim with a standard inner pressure, 50% of a standard tire load is applied to the tire, and the tire is grounded on a plane at zero camber angles, when maximum widths in the tire axial direction of ground contact surfaces of the first middle land portion, the crown land portion and the second middle land portion are respectively denoted by $W1m$, $Wc$ and $W2m$, the following formula (1) is satisfied:

$$W1m > Wc > W2m \quad (1).$$

6. The tire according to claim 5, wherein
the five land portions comprise a second shoulder land portion adjacent to the second middle land portion at the second tread edge side, and
in the 50%-loaded-state, when maximum widths in the tire axial direction of ground contact surfaces of the first shoulder land portion and the second shoulder land portion are respectively denoted $W1s$ and $W2s$, the following formula (2) is satisfied:

$$W1s > W1m > Wc > W2m \geq W2s \quad (2).$$

7. The tire according to claim 1, wherein
a maximum angle of the inclined portion with respect to the tire axial direction is equal to or less than a maximum angle of each first middle sipe with respect to the tire axial direction, and
a difference between the maximum angle of the inclined portion and the maximum angle of each first middle sipe is equal to or less than 5 degrees.

8. The tire according to claim 1, wherein
the five land portions comprise a crown land portion located on the tire equator,
the crown land portion comprises a first longitudinal edge extending in the tire circumferential direction on the first tread edge side, a second longitudinal edge extending in the tire circumferential direction on the second tread edge side, and a ground contact surface between the first longitudinal edge and the second longitudinal edge,
the crown land portion is provided with a plurality of first crown sipes each extending from the first longitudinal edge and having a closed end within the ground contact surface, and a plurality of second crown sipes each extending from the second longitudinal edge and having a closed end within the ground contact surface,
each of the plurality of first crown sipes and the plurality of second crown sipes comprises a pair of sipe edges,
at least one of the pair of sipe edges of at least one first crown sipe opens at the ground contact surface of the crown land portion via a chamfer portion over an entire length thereof,
the chamfer portion of the at least one first crown sipe has a chamfer width decreasing from the first longitudinal edge to the closed end thereof continuously,
at least one of the pair of sipe edges of at least one second crown sipe opens at the ground contact surface of the crown land portion via a chamfer portion over an entire length thereof, and
the chamfer portion of the at least one second crown sipe has a chamfer width decreasing from the second longitudinal edge to the closed end thereof continuously.

9. The tire according to claim 1, wherein
each of the pair of sipe edges of each first middle sipe opens at the ground contact surface via a chamfer portion over an entire length thereof.

10. The tire according to claim 9, wherein
a chamfer width $W11$ of an end portion on the first longitudinal edge side of each first middle sipe is in a range from 0.3 to 1.0 mm,
a chamfer depth of the end portion on the first longitudinal edge side of each first middle sipe is in a range from 0.3 to 1.0 mm,
a chamfer width $W12$ of an end portion on the second longitudinal edge side of each first middle sipe is greater than 0.3 and not greater than 2.0 mm, and
a chamfer depth of the end portion on the second longitudinal edge side of each first middle sipe is in a range from 0.3 to 2.0 mm.

11. The tire according to claim 10, wherein
the chamfer width $W12$ is in a range from 1.2 to 1.8 times the chamfer width $W11$.

12. The tire according to claim 2, wherein
each of the pair of sipe edges of each second middle sipe opens at the ground contact surface via a chamfer portion over an entire length thereof.

13. The tire according to claim 12, wherein
a chamfer width of an end portion on the second longitudinal edge side of each second middle sipe is in a range from 0.3 to 1.0 mm,
a chamfer depth of the end portion on the second longitudinal edge side of each second middle sipe is in a range from 0.3 to 1.0 mm, and
a chamfer width of an end portion on the first longitudinal edge side of each second middle sipe is greater than 0.3 and not greater than 2.0 mm, and
a chamfer depth of the end portion on the first longitudinal edge side of each second middle sipe is in a range from 0.3 to 2.0 mm.

14. The tire according to claim 13, wherein
the chamfer width of the end portion on the first longitudinal edge side of each second middle sipe is in a range from 1.2 to 1.8 times the chamfer width of an end portion on the second longitudinal edge side.

15. The tire according to claim 12, wherein
each first middle sipe extends in a straight shape over an entire length thereof, and
each second middle sipe extends in a straight shape over an entire length thereof.

16. The tire according to claim 12, wherein
the first middle land portion is provided with only the plurality of first middle sipes, and
the second middle land portion is provided with only the plurality of second middle sipes.

17. The tire according to claim 2, wherein
a maximum angle of the plurality of second middle sipes with respect to the tire axial direction is smaller than a maximum angle of the plurality of first middle sipes with respect to the tire axial direction.

18. The tire according to claim 2, wherein
the four circumferential grooves comprise a second shoulder circumferential groove located nearest to the second tread edge among the four circumferential grooves,
the five land portions comprise a second shoulder land portion having the second tread edge and adjacent to the second middle land portion via the second shoulder circumferential groove,
the second shoulder land portion is provided with a plurality of second shoulder sipes extending from the second shoulder circumferential groove to a location beyond the second tread edge,
at least one of the plurality of second shoulder sipes comprises an inclined portion extending from the second shoulder circumferential groove and inclined with respect to the tire axial direction, and an axial portion having an angle with respect to the tire axial direction smaller than that of the inclined portion of the at least one of the plurality of second shoulder sipes and not greater than 10 degrees, and
an absolute value $|\theta5-\theta4|$ of the difference between a maximum angle $\theta5$ of the plurality of second middle sipes with respect to the tire axial direction and a maximum angle $\theta4$ of the inclined portions of the at least one of second shoulder sipes with respect to the tire axial direction is larger than an absolute value $|\theta2-\theta1|$ of the difference between a maximum angle $\theta2$ of the plurality of first middle sipes with respect to the tire axial direction and a maximum angle $\theta1$ of the inclined portions of the at least one of the plurality of first shoulder sipes with respect to the tire axial direction.

19. The tire according to claim 2, wherein
the tread portion has a designated mounting direction on a vehicle,
the first tread edge is located on an outer side of the vehicle when the tire is mounted on the vehicle,
the five land portions comprise a crown land portion adjacent to the first middle land portion at the second tread edge side and a second middle land portion adjacent to the crown land portion at the second tread edge side, the crown land portion being located on the tire equator,
in a 50%-loaded-state where the tire is mounted on a standard wheel rim with a standard inner pressure, 50% of a standard tire load is applied to the tire, and the tire is grounded on a plane at zero camber angles, when maximum widths in the tire axial direction of ground contact surfaces of the first middle land portion, the crown land portion and the second middle land portion are respectively denoted by $W1m$, $Wc$ and $W2m$, the following formula (1) is satisfied:

$$W1m > Wc > W2m \tag{1},$$

the crown land portion comprises a first longitudinal edge extending in the tire circumferential direction on the first tread edge side, a second longitudinal edge extending in the tire circumferential direction on the second tread edge side, and a ground contact surface between the first longitudinal edge and the second longitudinal edge,
the crown land portion is provided with a plurality of first crown sipes each extending from the first longitudinal edge and having a closed end within the ground contact surface, and a plurality of second crown sipes each extending from the second longitudinal edge and having a closed end within the ground contact surface,
each of the plurality of first crown sipes and the plurality of second crown sipes comprises a pair of sipe edges,
at least one of the pair of sipe edges of at least one first crown sipe opens at the ground contact surface of the crown land portion via a chamfer portion over an entire length thereof,
the chamfer portion of the at least one first crown sipe has a chamfer width decreasing from the first longitudinal edge of the crown portion to the closed end thereof continuously,
at least one of the pair of sipe edges of at least one second crown sipe opens at the ground contact surface of the crown land portion via a chamfer portion over an entire length thereof,
the chamfer portion of the at least one second crown sipe has a chamfer width decreasing from the second longitudinal edge of the crown portion to the closed end thereof continuously,
in each first middle sipe, a chamfer width of an end portion on the second longitudinal edge side of the first middle land portion is in a range from 1.2 to 1.8 times a chamfer width of an end portion on the first longitudinal edge side of the first middle land portion, and
in each second middle sipe, a chamfer width of an end portion on the first longitudinal edge side of the second middle land portion is in a range from 1.2 to 1.8 times a chamfer width of an end portion on the second longitudinal edge side of the second middle land portion.

* * * * *